US012576886B2

(12) United States Patent
Silva et al.

(10) Patent No.: US 12,576,886 B2
(45) Date of Patent: Mar. 17, 2026

(54) MOTION PREDICTION

(71) Applicant: Five AI Limited, Bristol (GB)

(72) Inventors: Alexandre Silva, Edinburgh (GB);
Alexander Heavens, Edinburgh (GB);
Steffen Jaekel, Edinburgh (GB); **Bence
Magyar, Bristol (GB); Alejandro
Bordallo**, Edinburgh (GB)

(73) Assignee: Five AI Limited, Cambridge (GB)

( * ) Notice: Subject to any disclaimer, the term of this
patent is extended or adjusted under 35
U.S.C. 154(b) by 614 days.

(21) Appl. No.: 17/914,979

(22) PCT Filed: Mar. 29, 2021

(86) PCT No.: PCT/EP2021/058184
§ 371 (c)(1),
(2) Date: Sep. 27, 2022

(87) PCT Pub. No.: WO2021/198194
PCT Pub. Date: Oct. 7, 2021

(65) Prior Publication Data
US 2023/0150547 A1 May 18, 2023

(30) Foreign Application Priority Data

Mar. 30, 2020 (GB) ...................................... 2004635

(51) Int. Cl.
B60W 60/00 (2020.01)
(52) U.S. Cl.
CPC .... B60W 60/0027 (2020.02); B60W 60/0013
(2020.02); B60W 60/0015 (2020.02); **B60W
2554/404** (2020.02)

(58) Field of Classification Search
CPC .................... B60W 30/18159; B60W 60/0027
See application file for complete search history.

(56) References Cited

U.S. PATENT DOCUMENTS

2016/0161271 A1* 6/2016 Okumura ........ B60W 30/18154
701/25
2019/0049957 A1* 2/2019 Healey ................. G05D 1/0246
(Continued)

OTHER PUBLICATIONS

International Search Report; PCT/EP2021/058184; Date Jul. 2,
2021; by: Authorized Officer Nathalie Diebold.
(Continued)

*Primary Examiner* — Khoi H Tran
*Assistant Examiner* — Tristan J Greiner
(74) *Attorney, Agent, or Firm* — Andrew J. Tibbetts;
Samuel S. Stone; Greenberg Traurig, LLP

(57) ABSTRACT

A computer-implemented method of predicting behaviour of
an agent for executing an objective of a mobile robot in the
vicinity of the agent, in dependence on the predicted behav-
iour comprises: determining a reference path, wherein mul-
tiple actions are available to the agent, and the reference path
relates to one of those actions; projecting a measured
velocity vector of the agent onto a reference path, thereby
determining a projected speed value for the agent along the
reference path; computing predicted agent motion data for
the agent along the reference path based on the projected
speed value; and generating a series of control signals for
controlling a mobile robot to fulfil the objective in depen-
dence on the predicted agent motion data.

16 Claims, 9 Drawing Sheets

(56) References Cited

U.S. PATENT DOCUMENTS

| | | | | |
|---|---|---|---|---|
| 2019/0384994 | A1* | 12/2019 | Frossard | G05D 1/0246 |
| 2020/0074863 | A1* | 3/2020 | Jung | G01S 13/865 |
| 2020/0216064 | A1* | 7/2020 | du Toit | G06N 20/00 |
| 2021/0020045 | A1* | 1/2021 | Huang | G05D 1/692 |
| 2021/0108936 | A1* | 4/2021 | Seegmiller | B60W 60/00276 |

OTHER PUBLICATIONS

Rodrigues Maradona et al, "Autonomous Navigation in Interaction-Based Environments—A Case of Non-Signalized Roundabouts", Dec. 1, 2018 (Dec. 1, 2018), vol. 3, No. 4, p. 425-438.

\* cited by examiner

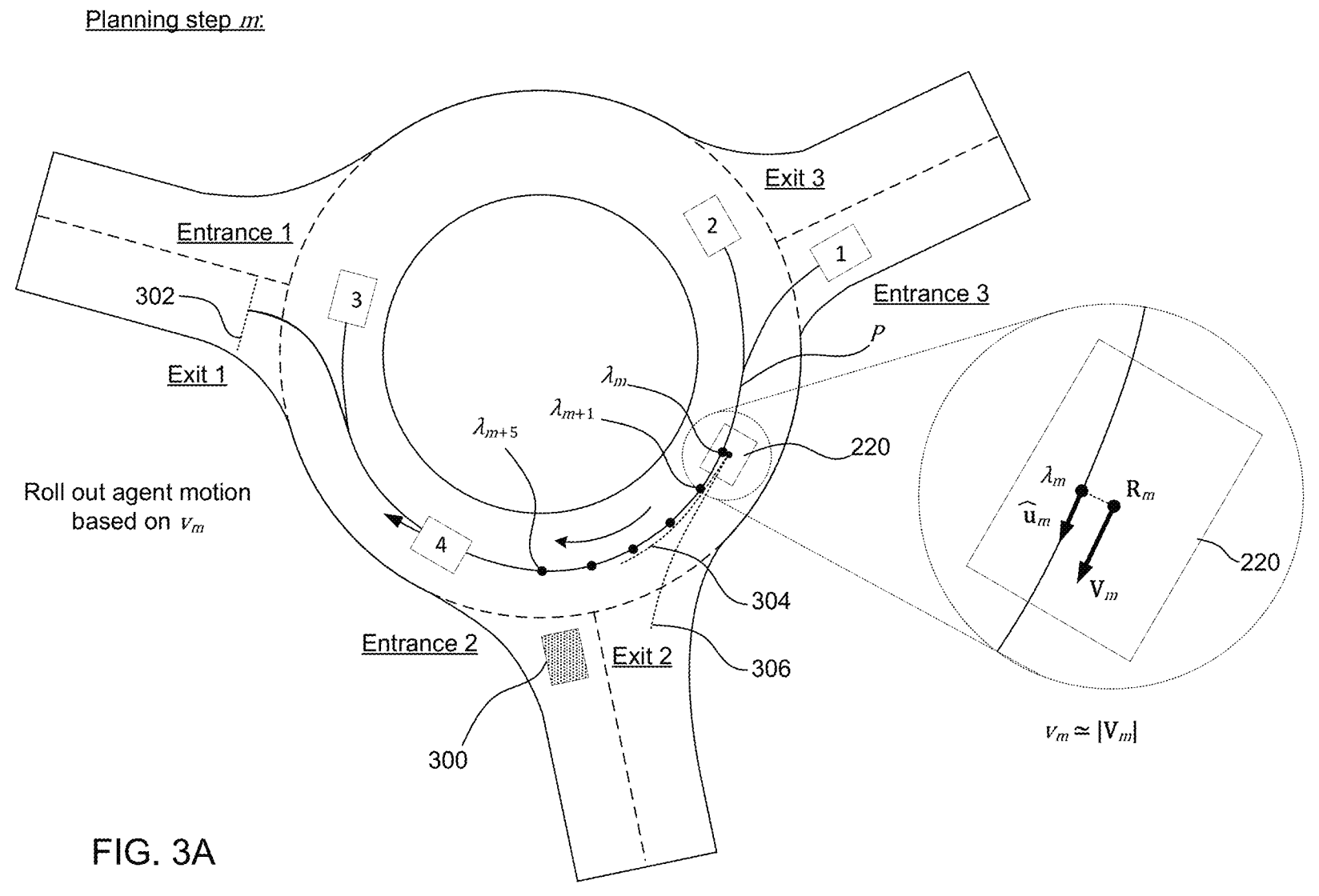

Planning step *m*:

220

Entrance 3

Exit 3

1

2

*P*

220

$\lambda_m$ $\lambda_{m+1}$ $\lambda_{m+5}$

304

306

Exit 2

Entrance 2

300

3

4

Entrance 1

302

Exit 1

Roll out agent motion
based on $v_m$ $\hat{u}_m$ $\lambda_m$ $R_m$ $V_m$ $v_m \simeq |V_m|$

FIG. 3A

Current prediction step - time $k$

Collision footprint

Planner rolls out possible ego trajectory to assess collision risk time $k+1$ time $k+2$ time $k+3$ time $k+4$ time $k+5$

MOTION PREDICTION

CROSS-REFERENCE TO RELATED APPLICATIONS

This application is the U.S. National Stage application, pursuant to 35 U.S.C. § 371, of PCT International Patent Application No. PCT/EP2021/058184, filed Mar. 29, 2021, designating the European Patent Office and published in English, which claims priority under 35 U.S.C. §§ 119 and 365 to Great Britain Patent Application No. 2004635.5, filed Mar. 30, 2020. The contents of each of the aforementioned applications are incorporated herein by reference in their entirety.

TECHNICAL FIELD

The present disclosure pertains to motion prediction techniques, and to the use of such techniques as a basis for planning in autonomous vehicles and other forms of mobile robot.

BACKGROUND

A rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. An autonomous vehicle (AV), also known as a self-driving vehicle, refers to a vehicle which has a sensor system for monitoring its external environment and a control system that is capable of making and implementing driving decisions automatically. Decisions are made based on sensory input and implemented using an actor system of the AV (e.g. which may comprise drive-by-wire steering motors, and a throttle and brake control system). This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Prediction is an important component of such autonomous systems. For example, an autonomous vehicle must be able to make adequate predictions about the motion of other vehicles, pedestrians etc. in its vicinity in order to plan its own trajectories safely and effectively in a way that accounts for the predicted motion of such agents. For real-time planning, motion predictions need to be provided in real-time. Bad predictions can result in unsafe planning decisions but also unduly "conservative" decisions that hinder progress unnecessarily (such as missing safe opportunities to join a target traffic flow). Good predictions allow a planner to make safe decisions without unnecessarily hindering the autonomous vehicle's progress though unduly conservative decisions.

SUMMARY

Full motion prediction is a complex problem. Some prediction methods are not conducive to real-time implementation and therefore have limited use in the context of mobile robots, whilst others require significant computing resources to run in real-time reliably. The present disclosure provides a computationally efficient form of motion prediction that is highly conducive to real-time implementation even with limited computational resources. This is a simplified form of prediction which has, nonetheless, been found to provide a useful basis for mobile robot planning in many practical situations.

A first aspect of the present invention provides a computer-implemented method of predicting behaviour of an agent for executing an objective of a mobile robot in the vicinity of the agent, in dependence on the predicted behaviour, the method comprising: determining a reference path, wherein multiple actions are available to the agent, and the reference path relates to one of those actions; projecting a measured velocity vector of the agent onto a reference path, thereby determining a projected speed value for the agent along the reference path; computing predicted agent motion data for the agent along the reference path based on the projected speed value; and generating a series of control signals for controlling a mobile robot to fulfil the objective in dependence on the predicted agent motion data.

A benefit of the method is that it can provide useful motion prediction in many situations even when the agent is not, in fact, taking the action to which the reference path under consideration relates. In embodiments of the invention, the agent may be assumed to be taking the action to which the reference path relates. The method can still provide useful predictions even when that assumption is, in fact, incorrect.

The reference path may be determined based on the objective of the mobile robot. For example, the reference path may relate to a "worst-case" action of the multiple actions, given the objective of the mobile robot (i.e. the assumed action may be a worst-case action given the objective of the mobile robot). This means the action most likely to hinder the mobile robot's own objective. If, in fact, the agent is taking a different action of the multiple actions, the method can still provide reliable motion predictions that, in turn, can be used as a basis for sensible and robust planning decisions.

For example, in an autonomous vehicle context, the agent may be a vehicle on a roundabout, and the objective may be for the mobile robot to join the roundabout at an entrance of the roundabout. The worst-case action may be the agent remaining on the roundabout past said entrance (action 2), and another of the available actions is the agent exiting the roundabout ahead of said entrance (action 1).

In this case, the prediction method proceeds on the assumption that the agent is taking action 2, and is therefore applied to the reference path relating to action 2. If the assumption of action 2 turns out to be correct, then the agent's speed is likely to follow the general direction of the reference path, and thus remain substantially parallel to it; the projected speed value will therefore approximately equal the magnitude of its velocity, and the motion prediction will therefore be performed on the basis of essentially the magnitude of the agent's measured velocity (i.e. on the basis of essentially the "full" velocity magnitude of the agent). If, in fact, the agent is taking action 1, then as it starts to approach the exit, the deviation between the direction of its velocity vector and the direction of the reference path will increase. As a consequence, the projected speed will decrease in proportion to the magnitude of its velocity, and that lower projected speed value will be used as a basis for the prediction—the agent is, in essence, still predicted to move generally along the reference path, but on the basis of a decreasing projected speed. Although this is not a perfect prediction, in practice it is still sufficiently useful for a planner of the mobile robot to make a sensible and safe decision about when to enter the roundabout that is not unduly conservative (e.g. the projected speed may decrease to a point that, on the basis of the consequent predicted motion, the planner deems that it is safe to pull out onto the roundabout ahead of the agent).

A roundabout scenario of this type is merely one example of a context in which the prediction method can be usefully applied. For example, in embodiments, the objective, may be for the mobile robot to join a target traffic flow, where the agent belongs to the target traffic flow or another hindering traffic flow. The assumed worst-case action may be the agent remaining in the traffic flow to which it belongs past a location of the mobile robot, and another of the available actions may be the agent leaving that traffic flow ahead of the location of the mobile robot. This would include roundabout scenarios of the kind outlined above (in that case, the target traffic flow would be the flow of traffic on the roundabout), but also other scenarios, e.g. other driving scenarios such as junction, turns etc.

In some embodiments, the agent may be assumed to be taking the above action without projecting the measured velocity vector onto any other path to which any other action of the multiple actions relates. In some embodiments, the agent may be assumed to be taking that action without any additional step of verifying which of the multiple actions the agent is actually taking.

In embodiments, the reference path may be determined based on the objective of the mobile robot.

The agent may be assumed to be taking said action to which the reference path relates.

The agent may be assumed to be taking said action without projecting the measured velocity vector onto any other path to which any other action of the multiple actions relates.

The agent may be assumed to be taking said action without any additional step of verifying which of the multiple actions the agent is actually taking.

The assumed action may be a worst-case action given the objective of the mobile robot.

The objective may be for the mobile robot to join a target traffic flow, wherein the agent belongs to the target traffic flow or another hindering traffic flow, wherein the assumed worst-case action is the agent remaining in the traffic flow to which it belongs past a location of the mobile robot, and wherein another of the available actions is the agent leaving that traffic flow ahead of the location of the mobile robot.

For example, the agent may be a vehicle on a roundabout, the objective may be for the mobile robot to join the roundabout at an entrance of the roundabout, the worst-case action may be the agent remaining on the roundabout past said entrance, and another of the available actions may be the agent exiting the roundabout ahead of said entrance.

The method may comprise assessing, by a planner, a plurality of possible ego trajectories for the mobile robot for fulfilling the desired objective, using ego motion data of each possible ego trajectory and the predicted agent motion data along the reference path.

Each possible ego trajectory may, for example, be assessed in relation to at least collision risk and comfort.

A wait period may commence upon the planner first determining that there exists an acceptable trajectory for fulfilling the objective, on the basis of the predicted agent motion, but the planner may not attempt to fulfil the objective until the wait period has expired, with at least one further iteration of the projecting and computing steps being performed using an updated measured velocity of the agent for determining whether an acceptable trajectory for fulfilling the objective still exists upon expiry of the wait period, the control signals for fulfilling the objective only being generated once the wait period has expired and only if an acceptable trajectory still exists.

For example, multiple iterations of the projecting and computing steps may be performed throughout the wait interval, and the control signals for fulfilling the objective may only generated upon expiry of the wait interval if an acceptable trajectory for fulfilling the objective is determined to exist at every iteration throughout the wait interval.

A controller may generate at least an initial control signal of the series of control signals in response to the planner outputting, to the controller, the acceptable trajectory at the end of the wait interval, but the planner may continue to assess possible ego trajectories and subsequent control signal(s) of the series of control signals are generated in dependence on that continued assessment.

The wait period may only commence if it is determined that the agent satisfies at least one measurement certainty condition.

The at least one measurement certainty condition may require at least one measurement error associated with the agent to not exceed an error threshold, if the agent is within a region of interest associated with a current location of the mobile robot.

The region of interest may be a predetermined region associated with said entrance of the roundabout.

If the measurement uncertainty condition is satisfied at the commencement of the wait interval, but stops being satisfied during the wait interval, the wait period may reset and may not commence again until the measurement uncertainty condition is once again satisfied.

The reference path may be determined in dependence on at least one of: a current location of the agent, and a current orientation of the agent.

The predicted agent motion data may be computed based on the projected speed value and a projected acceleration value, as determined by projecting a measured acceleration vector of the agent onto the reference path.

The predicted agent motion data may, for example, be computed based on the projected speed value and a curvature of the reference path.

More generally, the predicted agent motion data may be an input to a motion model, which generated the predicted agent motion data responsive thereto, based on one or more motion modelling assumptions.

Further aspects herein provide a computer system comprising one or more processors programmed or otherwise configured to carry out the method of the first aspect or any embodiment thereof, and computer program configured to program a computer system to carry out the method.

The computer system may, for example, be embodied in a mobile robot for controlling motion of the mobile robot, or in a simulator for simulating mobile robot motion in response to predicted agent motion data for one or more simulated agents.

BRIEF DESCRIPTION OF FIGURES

To assist understanding of the present disclosure and to show how embodiments of the present invention may be put into effect, reference is made by way of example to the accompanying drawings, in which:

FIG. 3A schematically depicts an example roundabout scenario at a particular time instant.

DETAILED DESCRIPTION

Figure 1:
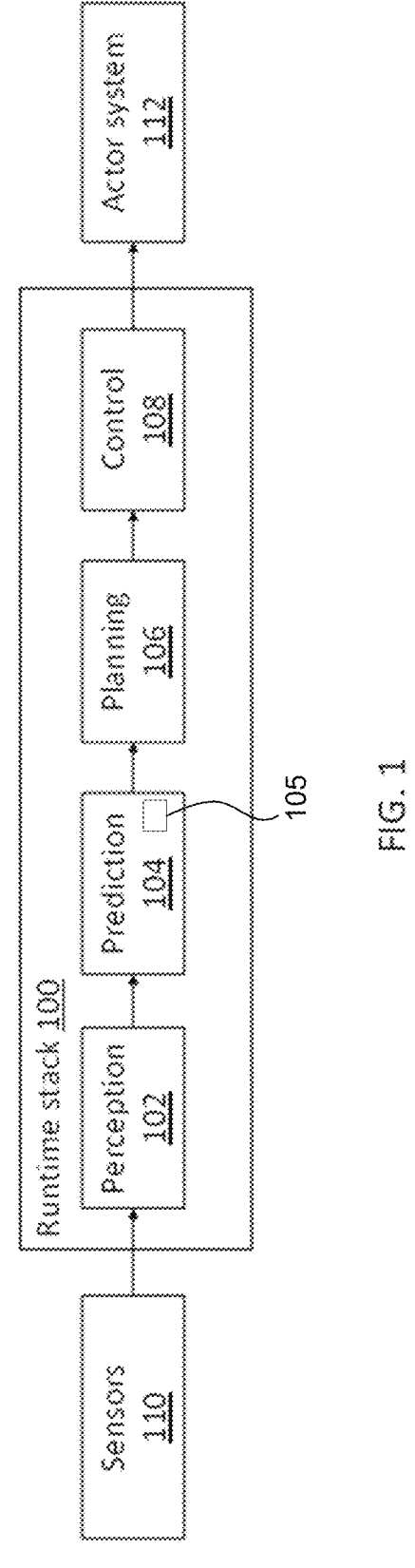
FIG. 1 shows a schematic block diagram of a runtime stack for an autonomous vehicle.

FIG. 1 shows a highly schematic block diagram of a runtime stack 100 for an autonomous vehicle (AV), also referred to herein as an ego vehicle (EV). The run time stack 100 is shown to comprise a perception module 102, a prediction module 104, a planner 106 and a controller 108.

The perception module 102 receives sensor outputs from an on-board sensor system 110 of the AV and uses those sensor outputs to detect external agents and measure their physical state, such as their position, velocity, acceleration etc.

The on-board sensor system 110 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment. The sensor outputs typically comprise sensor data of multiple sensor modalities such as stereo images from one or more stereo optical sensors, LiDAR, RADAR etc.

Stereo imaging may be used to collect dense depth data, with LiDAR/RADAR etc. proving potentially more accurate but less dense depth data. More generally, depth data collection from multiple sensor modalities may be combined in a way that preferably respects their respective levels of uncertainty (e.g. using Bayesian or non-Bayesian processing or some other statistical process etc.). Multiple stereo pairs of optical sensors may be located around the vehicle e.g. to provide full 360° depth perception.

The perception module 102 comprises multiple perception components which co-operate to interpret the sensor outputs and thereby provide perception outputs to the prediction module 104. External agents may be detected and represented probabilistically in a way that reflects the level of uncertainty in their perception within the perception module 102.

The perception outputs from the perception module 102 are used by the prediction module 104 to predict future behaviour of external actors (agents), such as other vehicle in the vicinity of the AV.

Predictions computed by the prediction module 104 are provided to the planner 106, which uses the predictions to make autonomous driving decisions to be executed by the AV in a given driving scenario. A scenario is represented as a set of scenario description parameters used by the planner 106. A typical scenario would define a drivable area and would also capture predicted movements of any external agents (obstacles, form the AV's perspective) within the drivable area. The driveable area can be determined using perception outputs from the perception module 102 in combination with map information, such as an HD (high-definition) map.

A core function of the planner 106 is the planning of trajectories for the AV (ego trajectories) taking into account predicted agent motion. A trajectory is planned in order to carry out a desired goal. The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to an on-board actor system 112 of the AV. In particular, the planner 106 plans manoeuvres to be taken by the AV and the controller 108 generates control signals in order to execute those manoeuvres.

The prediction component 104 implements a computationally efficient form of prediction method denoted by reference numeral 105 and referred to herein as "Prediction Lite". Prediction Lite is highly conducive to real-time implementation even in a resource-constrained platform. It provides a simplified form of motion prediction that has nonetheless been found to be effective in a number of driving contexts, including roundabouts. In a roundabout context, an AV is required to navigate a roundabout to a desired exit, often in the presence of one or more other vehicles. However, the disclosed techniques are not limited in their application to roundabouts, and can be applied in other contexts, e.g. involving turns, junctions, overtaking with following or oncoming vehicles etc., as discussed in further detail below.

Figure 2:
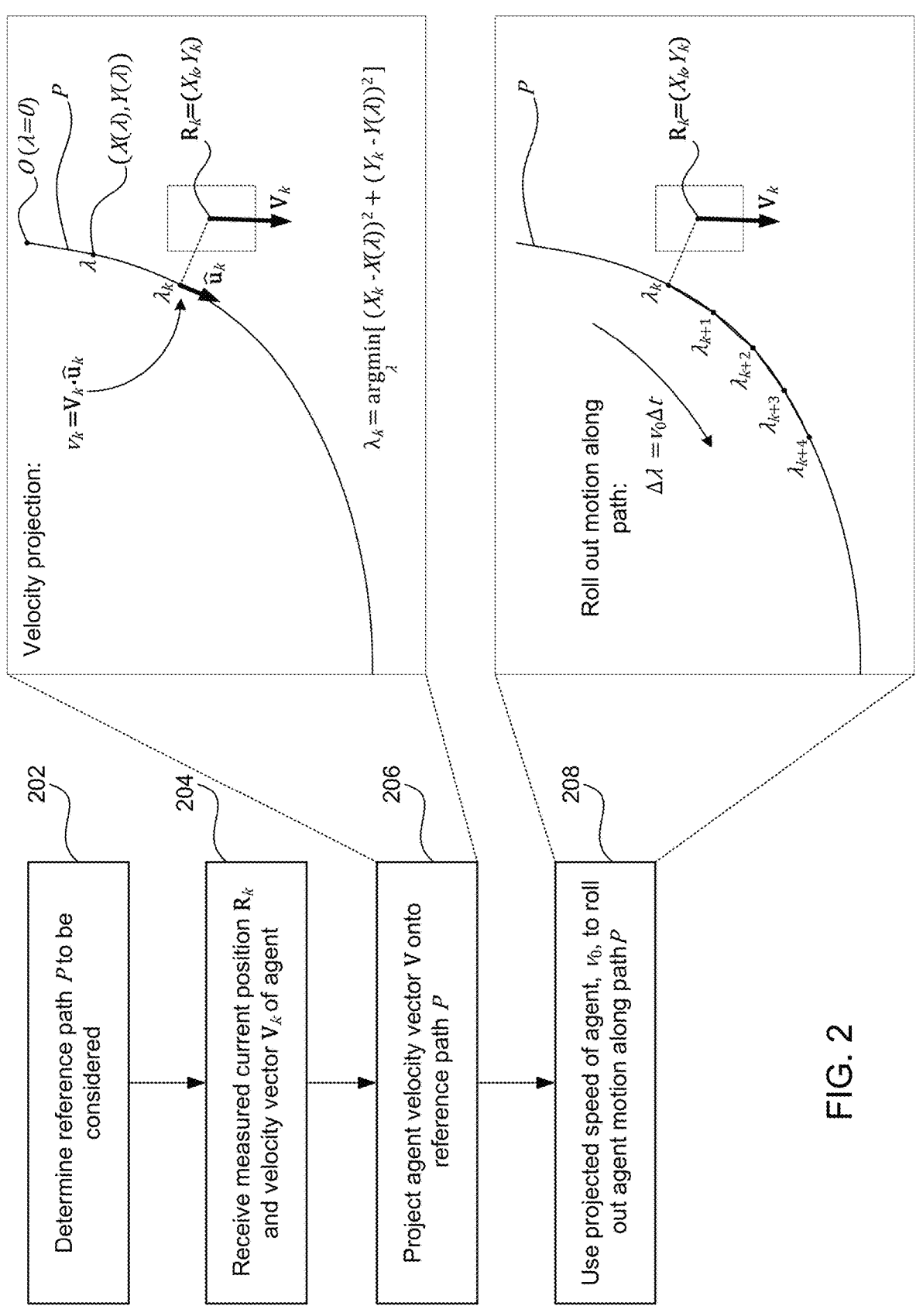
FIG. 2 shows a flowchart for an example implementation of a form of prediction method referred to herein as "Prediction lite", together with a geometric representation of the operations performed at certain steps.

FIG. 2 shows a flowchart for Prediction Lite 105 on the left-hand side.

The basis of the prediction is a "reference path" P, determined at Step 202. Factors which may be used to determine the reference path P are described later. The following examples consider motion prediction based on a current velocity vector and current position vector of an external agent, received at Step 204 from the prediction module 102. The motion prediction uses a projection of an agent's current velocity vector onto the reference path P (Step 206), which in turn is used to "roll out" the agent's motion, i.e. predict future motion of the agent (Step 208), along the reference path P. For the purpose of the prediction, it is assumed the agent will move in a direction along the reference path P, at a speed determined by the projection of its velocity vector onto P; underpinning this prediction method is the realization that those assumptions can provide a useful motion prediction, even in the case that the agent is not, in fact, following the reference path P. This is described in further detail below.

Steps 204 to 208 are performed repeatedly over time as new measurements of the agent's velocity and position become available. Each iteration of those steps may be performed in order to support a "planning step" by the planner 106, where planning step k is based on predicted motion of the agent as rolled out from its velocity and position measured at time index k (the agent's motion being rolled out over subsequent time instants indexed by k+1, k+2, k+3, . . . ). In the following examples, the time instants are uniformly separated in time by an interval Δt, i.e. $t_{k+p}=t_k+p\Delta t \forall p$ (i.e. time is discretised based on the time interval Δt).

The right-hand side of FIG. 2 shows geometric representations of Steps 206 (projection) and 208 (roll out). The agent whose motion is to be predicted is denoted by reverence numeral 220.

The velocity vector and position vector of the agent 220 at time k are denoted by $V_k=(V_{kx}, V_{ky})$ and $R_k=(X_k, Y_k)$ respectively. In planning step k, $V_k$ and $R_k$ are the current velocity and position of the agent 220. The agent's position $R_k$ is defined at the position of a canonical reference point of the agent, such as a center point of the agent 220.

The reference path P is represented as a curve in 2D space, which can be conveniently parameterized by a distance λ along the path P from any chosen reference point O on the path at which λ=0. Each point on the path P is represented by a unique value of λ, and the position of that point in 2D space can be expressed in Cartesian coordinates as (X(λ), Y(λ)). In other words, λ is the distance along the path P (i.e. the arc length) between the reference point O and the point (X(λ), Y(λ)). For conciseness, the point at distance λ along P may be referred to as the point A on P.

There is no requirement for the agent 220 to be on the reference path P, i.e. the current position $R_k$ of the agent 220 is not necessarily located on the path P. The same reference path P may be used for multiple agents at different locations, in which case the described steps are performed for each agent.

At Step 206, the agent's velocity vector $V_k$ is projected onto the path P, in order to compute a projected speed value $v_k$ for the agent 220 along the path P. This projection is defined mathematically as follows:

$$v_k=V_k \cdot \hat{u}_k, \tag{1}$$

where $u_k$ is a unit normal vector to the path P the point $\lambda_k$, defined as $$\lambda_k=\text{argmin}_\lambda[(X_k-X(\lambda))^2+(Y_k-Y(\lambda))^2]. \tag{2}$$

That is, the projected speed $v_k$ is defined as the vector dot product between the agent's current velocity $V_k$ and the unit normal $\hat{u}_k$ to the path P at the point $\lambda_k$ closest to the position $R_k$ of the agent 220. It can be seen that Equation (2) defines $\lambda_k$ as the point on P having the shortest distance squared (and therefore the shortest distance) to $R_k$.

The velocity $V_k$ that is used in Equation 1 could be measured in a number of ways. For example, it could simply be estimated based on changes in a measured location of the agent over time. However, it could also be that the e.g. the direction component $\hat{u}_k$ is estimated in a different way. For example, this could be determined as (or based on) a measured orientation of the agent, e.g. by some form of 3D perception component (such as a 3D bounding box detector). This could provide additional tolerance to uncertainty. For example, one component of the stack 102 could measure the agent's velocity based on changes in its measured location over time, and another component could measure a current orientation of the agent, both with respective uncertainties. It could, for example, be that $\hat{u}_k$ is taken as whichever measurement has the lowest uncertainty (i.e. $\hat{u}_k$ would be taken as the direction estimate based on changes in measured location if that is determined to have the least error, but as the measured orientation if that has the least error). For the avoidance of any doubt, either case would amount to a velocity measurement as that term is used herein (i.e. a measurement of velocity includes the case where the direction of the velocity is measured as a current orientation of the agent, among others).

The projected speed $v_k$ can also be expressed as $$v_k=V_k \cos \theta_k, \tag{3}$$

where $V_k=|V_k|$ (the magnitude of the current velocity $V_k$) and $\theta_k$ is the angular separation between the path normal $\hat{u}_k$ and the agent's velocity $V_k$.

The point $\lambda_k$ may be referred to as the current path location of the agent 202, and the projected speed $v_k$ may be referred to as the current path speed.

The projected speed $v_k$ and current path location $\lambda_k$ are then used at Step 208 to roll out the agent's motion over subsequent time instants as follows:

$$\lambda_{k+p}=\lambda_{k+p-1}+v_k\Delta t \tag{4}$$

for p≥1. The point $\lambda_{k+p}$ is referred to as a predicted path location of the agent 220 at future time instant time k+p, which is ultimately derived from the current path location at time k as determined in Step 204. A set of predicted path locations $\lambda_{k+1}, \lambda_{k+2}, \lambda_{k+3}, \ldots$ is one form of predicted motion data that may be provided by Prediction lite 105.

Equation 4 assumes that the path speed $v_k$ remains constant, such that the distance along the path P increments by the same amount $\Delta\lambda=v_k\Delta t$ (distance increment) with each time increment, starting from the current path location $\lambda_k$. By way of example, FIG. 2 shows four predicted path locations $\lambda_{k+1}, \lambda_{k+2}, \lambda_{k+3}$ and $\lambda_{k+4}$, each determined from the path speed $v_k$ in this manner. Under the assumption of constant path speed, the distance along the path at time k+p for p=1,2,3, . . . is given by $$\lambda_{p+k}=\lambda_k v_k p\Delta t. \tag{5}$$

It can be seen that the distance increment Δλ decreases as the path speed $v_k$ decreases, which in turn depends not only on the magnitude of the agent's velocity $|V_k|$, but also on the cosine of the angular separation, $\cos \theta_k$, between the agent's velocity $V_k$ and the path normal $\hat{u}_k$ at $\lambda_k$. Hence, a smaller distance increment could result from a smaller magnitude of the $V_k$ velocity, but could also result from a greater angular deviation between the direction of the velocity $V_k$ and the path normal $\hat{u}_k$.

Although simplified, the assumption of constant path speed has been found to be effective, and to provide a sufficient robust prediction for many planning scenarios. However, the roll out of the agent's motion on the basis of its projected speed $v_k$ at time k does not have to assume that the path speed remains constant.

For example, one extension of the method projects an acceleration vector $a_k$ of the agent 220 at time k onto the reference path P in the same manner, to obtain a projected acceleration value (path acceleration)

$$a_k=a_k \cdot \hat{u}_k. \tag{6}$$

The projected acceleration $a_k$ is then used to roll out the agent's motion along the path P. For example, the projected acceleration $a_k$ could be assumed to remain constant, such that the path speed and at time k+p is given by the second-order approximation $$v_{k+p}=v_{k+p-1}+a_k\Delta t=v_k+a_k p\Delta t. \quad (7)$$

The path location at time k+p can, in turn, be derived as $$\lambda_{k+p} = \lambda_{k+p-1} + v_{k+p-1}\Delta t + \frac{1}{2}a_k\Delta t^2 \quad (8)$$

$$= \lambda_k + v_k p\Delta t + \frac{1}{2}a_k(p\Delta t)^2.$$

As will be appreciated, this can be extended to remove the assumption of constant acceleration, for example by measuring and projecting a jerk vector $j_k$ (rate of change of acceleration) for use in the motion roll out based on a third-order approximation etc.

Another extension uses one more characteristics of the path P itself in order to predict changes in the path speed over time. For example, it may be assumed that the path speed will decrease (resp. increase) as the curvature of the path P increases (resp. decreases). For example, rather than assuming constant acceleration, the path acceleration could be assumed to vary as a function of changes in the path curvature. For example, writing the path curvature at path location $\lambda_q$ as $C_q$, the path acceleration could be assumed to vary as $$a_{p+k}=a_{p+k-1}+f(C_{k+p}-C_{k+p-1}), \quad (9)$$

i.e. based on a function $f$ of the change in path curvature between $\lambda_{k+p}$ and $\lambda_{k+p-1}$, with $$\lambda_{k+p+1} = \lambda_{k+p-1} + v_{k+p-1}\Delta t + \frac{1}{2}a_{k+p-1}\Delta t^2. \quad (10)$$

Equation 10 is a second-order approximation, but this is merely an example and different orders of approximation may be used.

The two approaches could be combined, e.g. in the example of Equation 9, the path acceleration at time k could be obtained by measurement and projection of the acceleration vector $a_k$ onto the path P, as per Equation 6.

Alternatively, the path acceleration $a_p$ at any time p could be an assumed acceleration (without using any explicit measurement of the acceleration at time k), e.g. the acceleration could be assumed to be given by a function of the path curvature $a_q=g(C_q)$, and Equation 10 can be applied with assumed acceleration derived thus.

As will be appreciated, the above examples of agent motion roll out are illustrative but not exhaustive. Other ways of rolling out the motion of the agent 220 along the reference path P will be apparent in view of the teaching presented herein. The roll out of the agent's motion will use the agent's projected speed $v_k$ and may or may not use additional measurement(s)/projection(s) depending on the implementation.

Figure 3B:
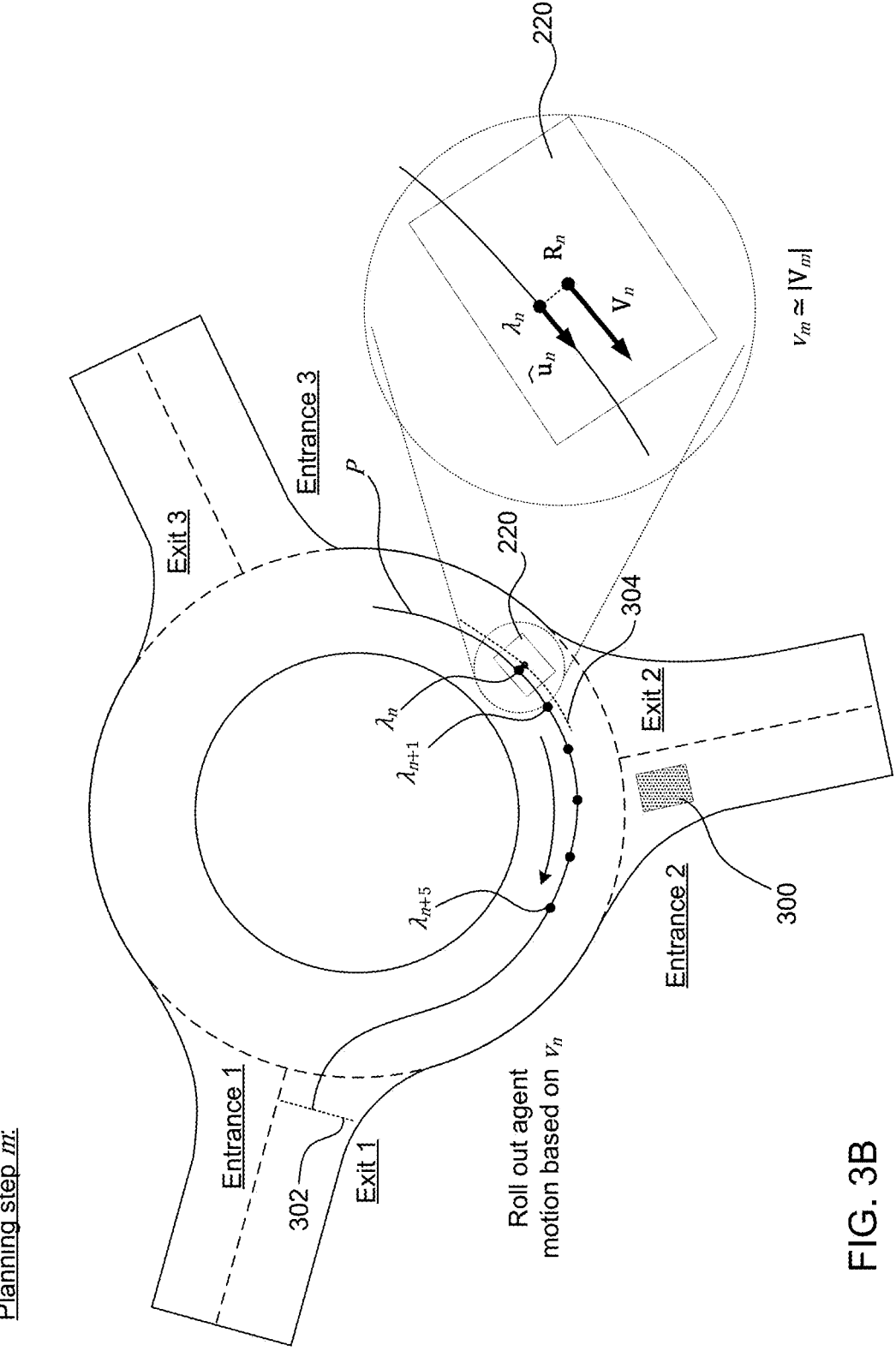
FIGS. 3B and 3C shows two possible ways the scenario might subsequently develop.
Figure 3C:
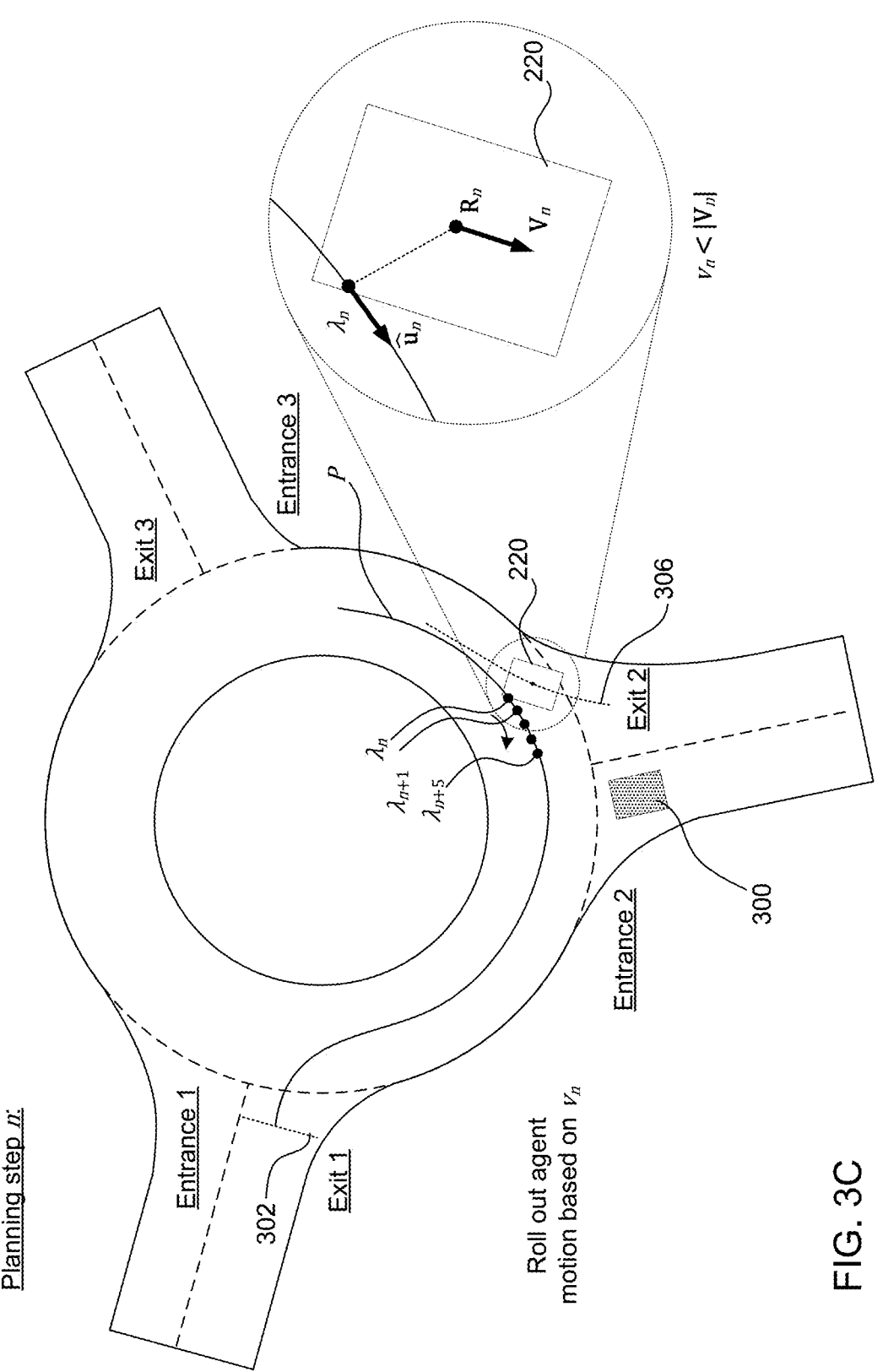

With reference to FIGS. 3A to 3C, an example will now be described to demonstrated how Prediction Lite 105 provides useful motion predictions for the purpose of planning by the planner 106.

Prediction Lite 105 is particularly useful in a scenario in which an AV (ego vehicle) has an objective of joining a flow of traffic. A traffic flow that an AV seeks to join is referred to herein as a "target" traffic flow. A traffic flow that could hinder the fulfilment of that objective is referred to as a "hindering" traffic flow. A traffic flow can be both a target and a hindering traffic flow, e.g. the AV seeks to join a particular traffic flow but needs to wait for a sufficient gap within in to do so safely. However, a hindering traffic flow is not necessarily one that the AV has the objective of joining, e.g. some scenarios may require an AV to cross an oncoming traffic flow in order to join a target traffic flow, and the oncoming traffic flow may be a hindering traffic flow in that event (e.g. a left-turn scenario in a left-hand drive country where vehicles drive on the right, or a right-turn scenario in a right-hand drive country where vehicles drive on the left). A general example where Prediction Lite 105 may be useful is any scenario in which there are one or more hindering traffic flows which have priority over the ego vehicle, i.e. the ego vehicle must give way to the hindering traffic flow(s). Such scenarios can, for example, arise at certain types of junction (e.g. the ego vehicle is turning onto or crossing a major road from a minor road) and also roundabouts, examples of which are considered below.

One example of a scenario where Prediction Lite 105 is useful is one in which a vehicle of a hindering traffic flow (the agent in this example) has a set of possible actions available to it that generally correspond to different paths. A general example would be where the agent has the option of staying in the hindering traffic flow to move past the ego vehicle (so as to hinder the ego vehicle's objective of joining or crossing the hindering traffic flow), but also has the option of leaving the hindering traffic flow before that point (which could potentially give the ego vehicle an opportunity to fulfil that objective).

One such example depicted in FIGS. 3A to 3C is a roundabout scenario, in which an ego vehicle 300 seeks to join a roundabout having three exits (Exits 1 to 3) and three entrances (Entrances 1 to 3), with Entrance 1 adjacent Exit 1, Entrance 2 adjacent Exit 2, and Entrance 3 adjacent Exit 3. The ego vehicle 300 is located near to Entrance 2, and has the objective of joining the roundabout at Entrance 2, with the ultimate goal of reaching a location 302 of Exit 1. The depicted roundabout is of the kind found in right-hand drive countries (i.e. vehicles are required to drive on the left), with traffic moving clockwise around it, and each entrance located to the left of the adjacent exit. All traffic to the right of the ego vehicle 300 that is either inside the roundabout, or about to enter Entrance 3 has priority over it. Broadly speaking, a vehicle 220 that is approaching the ego vehicle 300 from the right—the agent in this example—can take one of two actions: exit the roundabout at Exit 2 (Action 1), or stay on the roundabout e.g. to exit at Exit 1 or Exit 3 (Action 2). More generally, traffic to the right of the ego vehicle may have priority as described by the rules of the road.

Prediction Lite 105 works on the assumption that an agent 220 whose motion is to predicted will take a particular action (the "assumed action") out of the set of multiple actions available to it. The path P onto which the agent's velocity $V_k$ is projected is determined on the basis that is relates to the assumed action of the agent 220. This leverages the realization that the projected speed $v_k$ computed for the assumed action can still be a useful metric even when the agent is, in fact, taking a different one of the available actions (and thus a path other than P).

The choice of assumed action leverages knowledge of the driving scenario in which Prediction Lite 220 is to be applied. In some cases, the assumed action will be a "worst-case" action for the driving scenario—i.e. worst-case from the perspective of the ego vehicle 300. That is to say, the action determined to be most likely to hinder the ego vehicle's own objective.

Taking the roundabout example of FIGS. 3A to 3C, from the perspective of the ego vehicle 300, Action 2 (staying on the roundabout) is the worst-case action the agent 220 can take, in that, of the actions available to it, it is the one most likely to hinder the ego vehicle's own objective of joining the roundabout. Action 2 is therefore the action the agent 220 is assumed to be taking. A reference path P corresponding to Action 2 is therefore determined around the roundabout, which continues clockwise past Exit 2 and Entrance 2.

The reference path P does not have to exactly correspond to the path the agent 220 would follow if taking Action 2. Indeed, there will be many possible paths the agent could take 220 to stay on the roundabout. The path P need only be generally representative of the action to which it corresponds. For a known roundabout it could, for example, be predetermined though manual annotation of the roundabout layout, or derived from observation of traffic using the roundabout over time (e.g. using machine learning), or a combination of manual annotation and observation of actual driving behaviour (e.g. manual annotation informed by observations of actual traffic flow).

In this case, only the reference path P associated with the worst-case action is considered. Even though other action(s) are available to the agent 220, no projection/roll out is performed for any of those other action(s)—the agent 220 is simply assumed to be taking the worst-case action.

For optimal results, the path that is used to roll out an agent's motion may be determined in dependence on contextual information about the agent. For example, for the vehicles numbered 1 and 2 in FIG. 3A, different paths may be used for their respective roll outs (vehicle 1 is already on the roundabout, and vehicle 2 is about to enter it at Entrance 3). To accommodate this, an extra piece of logic within prediction lite 105 may, for example, select the most appropriate path for a given agent, from multiple possible agent paths, which could be predetermined. One way would be to select the closest path to the agent being predicted (still assuming worst-case behaviour of the agent from the EV's perspective, which in this case is the agent staying in the roundabout all the way to Exit 1). The case of vehicle 1 and 2 could, for example, be accommodated with two possible agent paths—one for vehicles already on the roundabout to the right of the ego vehicle 300, and the other for vehicles joining the roundabout at Entrance 3. Alternatively or additionally, the input path can be selected or generated based on a current pose of the predicted agent.

FIG. 3A shows the scenario at time k=m when the agent's velocity $V_m$ is essentially parallel to the path normal $\hat{u}_m$, i.e. the agent 220 is moving substantially parallel to the path P at k=m. At this time instant m, the agent 200 is far enough away from Exit 2 that its behaviour might be essentially the same whether or not it is intending to take Exit 2 (i.e. its behaviour might feasibly be essentially independent of its chosen action at this point). By way of example, a first path 304 is shown which is one possible path the agent 220 might take were it to actually stay on the roundabout (Action 1), and a second path 306 is shown which is one possible path the agent might take were it to leave the roundabout at Exit 2 Action 2). At time m, the two are essentially indistinguishable. Therefore, the prediction provided by Prediction Lite 220 should be robust to this uncertainty in order to allow the planner 106 to plan safely and effectively.

Because $V_m$ is essentially parallel to the path at time m, the projected speed $v_m$ at time m is approximately equal to the velocity magnitude $V_m=|V_m|$. Therefore, when its motion is rolled out along the path P, that roll out is essentially performed on the basis of its velocity magnitude $|V_m|$. To put it another way, the direction of the ego vehicle's velocity at time m will not significantly reduce its projected speed $v_k$. The motion of the agent 220 will then be rolled out along P on that basis, as indicated by the points $\lambda_{m+1}, \ldots, \lambda_{m+5}$. The spacing of those points reflects the fact that the roll out is performed on the basis of essentially the "full" velocity magnitude $|V_m|$.

With reference to FIG. 3B, in the case that the agent 220 is taking the worst-case action (Action 2—staying on the roundabout), as it moves, its velocity $V_k$ will remain approximately parallel to the reference path P. Accordingly, as it moves around the roundabout past Exit 2 and Entrance 2, its projected speed $v_k$ will remain approximately equal to the magnitude of its velocity $|V_m|$. FIG. 3B shows the scenario a later time k=n, in this case that the agent 220 has actually followed the first path 304 because it intends to stay on the roundabout (Action 2). As in FIG. 3A, its velocity $V_n$ at time n is therefore still essentially parallel to the reference path P, therefore when its motion is rolled out over subsequent time intervals n+1, n+2, . . . , that rollout is also performed on the basis of essentially the full velocity magnitude $|V_n|$ at time n, since the projected speed since the projected speed at that time $v_n \approx |V_n|$.

By contrast, FIG. 3C shows a second possibility at time k=n when the agent's velocity $V_n$ has a significant angular offset from the path normal $\hat{u}_n$, i.e. the agent 220 is not moving substantially parallel to the path P at k=n. This is because the agent 220 has instead taken the second path 306, in order to leave the roundabout at Exit 2 (Action 1). As a consequence, the projected speed $v_n$ at time n is significantly lower than the velocity magnitude $V_n=|V_n|$. This, in turn, means that the motion of the agent 220 is rolled out over subsequent time instants n+1, n+2, . . . on the basis of the lower projected speed $v_n$, which is reflected in the shorter spacing of the points $\lambda_{n+1}, \ldots, \lambda_{n+5}$ along the path P. Hence, even if the velocity magnitudes at times m and n were similar (i.e. $V_m \approx V_n$), in this situation, the projected speed $v_n$ at time n would still be significantly lower than the projected speed $v_m$ at time m, with consequent implications for the rolled-out motion along P.

The details of how predictions from prediction lite 105 are used in planning are matter of design choice. For example, in FIG. 3A, it could be that prediction lite 105 provides a prediction for the vehicle numbered 4, but that this is not particularly useful given the EV's current objective (vehicle 3 having essentially already moved past Exit 1). Suitable criteria could be applied by the planner 106 as to when to make use of predictions from prediction lite 105 and when to disregard them, which could take into account e.g. the location other(s) in relation to the EV 300 and/or its objective, agent speed etc.

Figure 4:
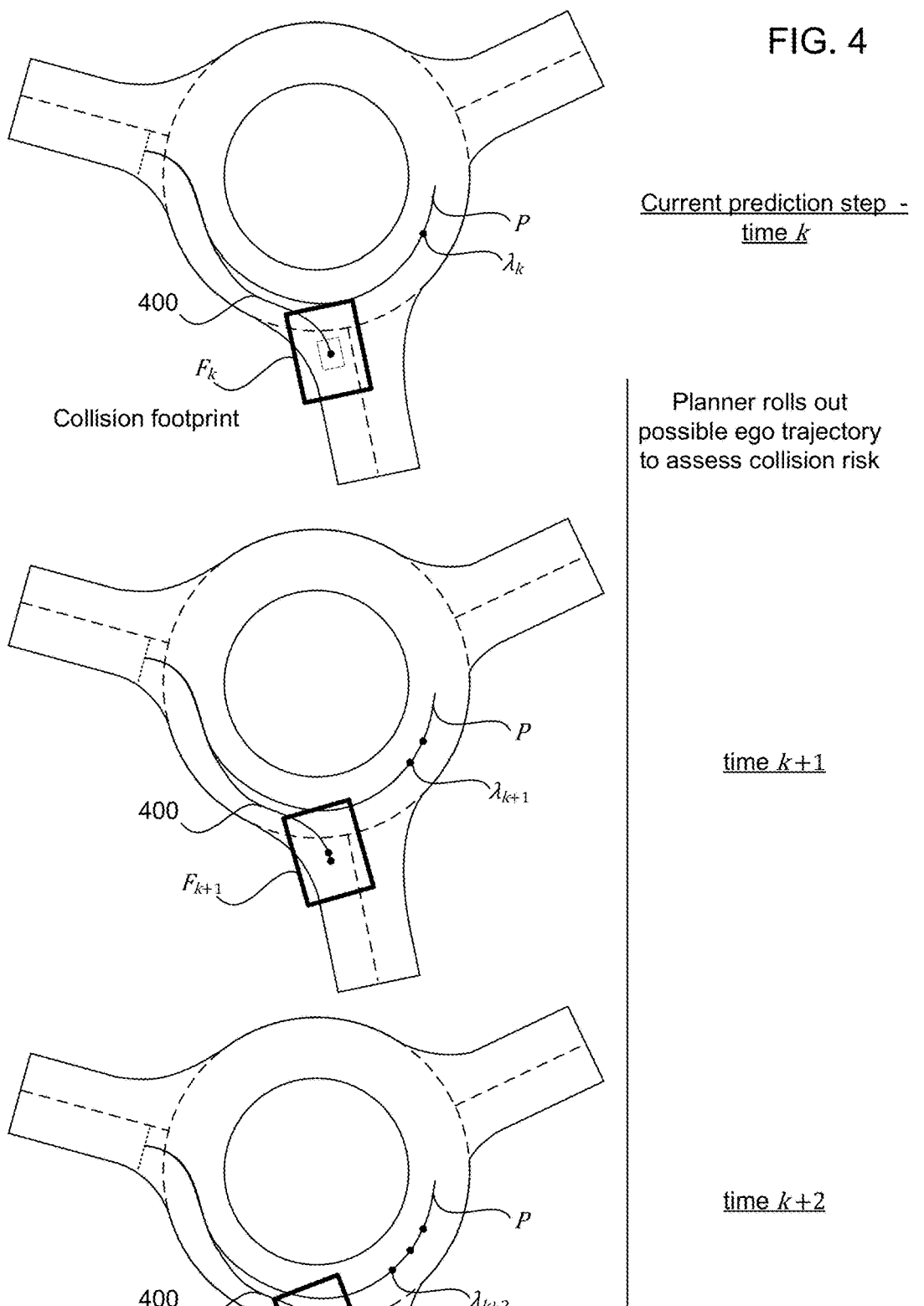
FIG. 4 shows a geometric representation of ego vehicle motion rolled out by a planner together with agent motion rolled out by Prediction Lite.
Figure 4:
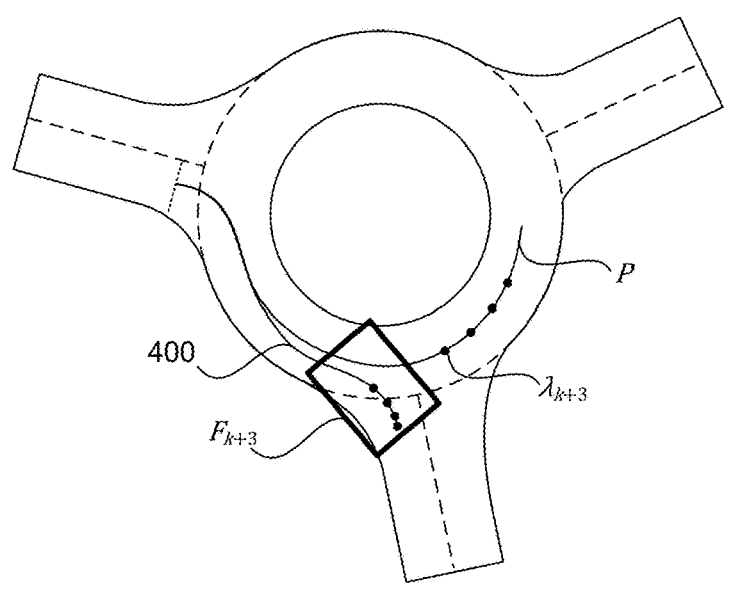
Figure 4:
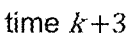
Figure 4:
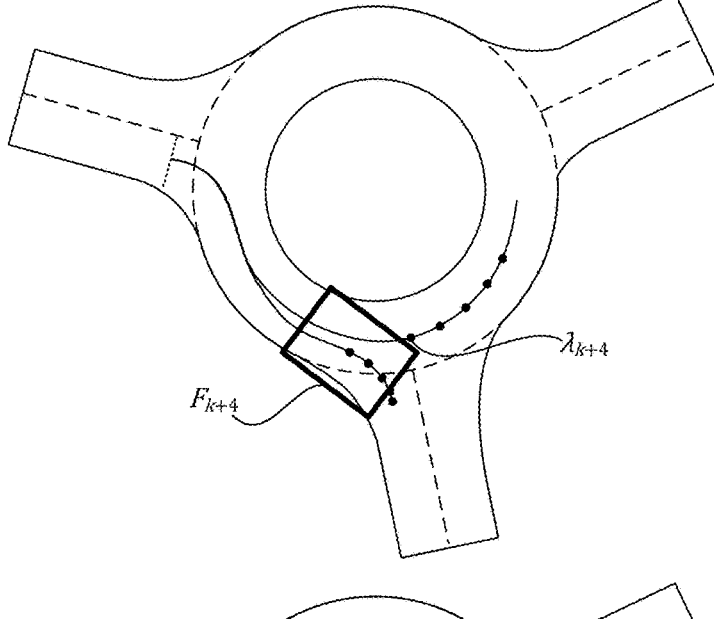
Figure 4:
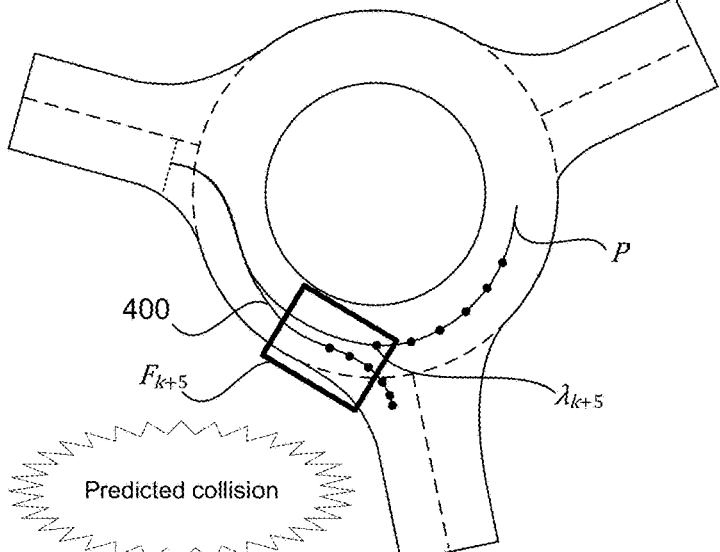

FIG. 4 illustrates how the planner 106 of the ego vehicle 300 may use a motion prediction from Prediction Lite 105 as a basis for trajectory planning. The interaction between the projected speed $v_k$ and the assessment by the planner 106 of a given trajectory is considered below.

It is assumed that the ego vehicle's ultimate goal is to reach the location 302 of Exit 1. This goal could, for example, be determined by a route planner of the runtime stack 100 (not shown in FIG. 1). In order to realize the goal of reaching the location 302 of Exit 1, the planner 106 must plan a safe trajectory that respects the rules of the roundabout and takes into account the predicted behaviour of any other roundabout users, including the agent 220.

Prediction Lite 105 is used in this context to provide motion predictions that can be used by the planner 106 to assess the suitability of possible trajectories, which will typically involve some assessment collision risk and possibly other factor(s) such as comfort. Trajectories which are determined to have an unacceptably high collision risk based on predicted agent motion are rejected. Trajectories may also be rejected on the basis of e.g. comfort, e.g. a trajectory may be determined to be collision free based on the predicted motion of other agent(s), but be rejected because it involves excessive jerk (rate of change of acceleration). In the present example, each considered trajectory encodes a (static) path from the ego vehicle's current location to the location 302 of Exit 1, as well as planned ego motion along that path. Such a path may be referred to as an ego path, to distinguish from the reference path P used as a basis for prediction.

The top of FIG. 4 depicts the roundabout scenario of FIGS. 3A to 3C at some time k. FIG. 4 considers planning step k, i.e. the planning step implemented on the basis of the predictions rolled out from the measurements at time index k.

Moving down the page, FIG. 4 shows the agent's motion rolled out, by Prediction Lite 105, over subsequent time intervals k+1 to k+5, along the reference path P, i.e. in order to compute the predicted path locations $\lambda_{k+1}, \lambda_{k+2}, \ldots \lambda_{k+5}$ of the agent 220 at future time instants k+1, k+2, . . . , k+5 respectively.

In conjunction with the roll-out of the agent motion, the ego-vehicle's own motion is also rolled out along a planned ego path. As can be seen, in this example, the planned trajectory involves gradually accelerating the ego vehicle 300 along the planned ego path 400, resulting in a greater distance being travelled by the ego vehicle 300 with each increment in time.

The configuration of the ego vehicle 300 at each time instant k, . . . , k+5 is captured by "collision footprint" $F_p \subset \mathbb{R}^2 \forall p=k, k+1, k+2, \ldots$ around the ego vehicle 300. The collision footprint is a shape which encompasses the ego vehicle 300, but is larger than the area of the ego vehicle 300 to provide an additional "buffer zone". The location and orientation of the collision footprint $F_k$ at time k is defined by the current position and orientation of the ego vehicle 300, and the position and orientation of each subsequent collision footprint $F_{k+1}, F_{k+2}, \ldots$ is determined by rolling out the ego vehicle's motion for the planned trajectory, as shown in FIG. 4. The shape and size of the collision footprint $F_p$ could be fixed, and this example shows a rectangle shape of constant size. However, the shape could be adapted e.g. to specific roundabouts (e.g. busier, uniformly shaped) that require different shapes/sizes even along the ego-vehicle path.

A predicted collision occurs if, at any time instant p under consideration, the predicted path location $\lambda_p$ of the agent 220 is determined to intersect the collision footprint $F_p$ of the ego vehicle 300. By way of example, a predicted collision is depicted at time instant k+5 in FIG. 4. The agent 220 is modelled as a point on the path P in this context. However, the area of the agent can be accommodated in this model by increasing the size of the collision footprint $F_p$. Note that "predicted collision" in this context mean collision (or intersection) with the padded footprint $F_p$ of the ego vehicle. The padding represents the minimum headway to be kept towards any direction relative to the ego-vehicle, and a collision is said to occurs if this minimum headway is breached.

Assuming that a hard requirement is that any trajectory should have zero predicted collisions, the planned ego trajectory would be rejected by the planner 106 on the basis of the predicted collision at time k+5.

The roll out of the agent's motion is performed on the basis of its projected speed $v_k$. If the magnitude of the agent's current velocity $|V_k|$ were lower, that would also reduce its projected speed $v_k$, and potentially avoid the predicted collision altogether.

Note, however, that the projected speed could also be reduced by the direction of the current velocity $V_k$ deviating from the reference path P. Using the example of FIG. 3B (the agent 220 is staying on the roundabout), it can be seen that the projected speed v in this situation would likely lead to a predicted collision for any ego trajectory that involves the ego vehicle entering the roundabout before the agent 220 has passed by. By contrast, in the situation of FIG. 3C (the agent 220 has already moved to exit the roundabout at Exit 2), the projected speed v is much lower, and there may well be viable ego trajectories that would involve the ego vehicle 300 joining the roundabout immediately, without waiting for the agent 220.

Note that, in this case, the assumption is that the agent 220 is taking Action 2 (staying on the roundabout), and the prediction is still useful because the fact that the agent 220 is actually taking Action 1 is reflected in the lower projected speed k. In this case, no additional steps are taken to verify which action the agent 220 is actually implementing since a sufficient level of information about its predicted behaviour is captured in the single projected speed value $v_k$.

The greater the deviation between the direction of $V_k$ and the direction of the path $\hat{u}_k$, the lower the projected speed $v_k$ in proportion to the velocity magnitude $V_k$ (as per Equation 3). The lower the value of the projected speed $v_k$, the more likely it is that the planner 106 will decide it is safe to pull out (join the roundabout) without waiting for the agent 220 to pass (i.e. without waiting for it to carry on past the current location of the autonomous vehicle 300 located near Entrance 2). A reduction in the projected speed $v_k$ that causes the planner 106 to decide it is safe to pull out could be caused not only by a reduction in the magnitude of the agent's velocity $|V_k|$ but also by the agent's direction of motion deviating from the reference path, which is reasonable as the latter behaviour clearly indicates that the agent 200 is exiting the roundabout at Exit 2 (this reflects the situation depicted in FIG. 3C—in this situation, potentially the reduction in projected speed would remove the predicted collision, which in turn could cause the planner 106 to decide it is safe to pull out).

Figure 5:
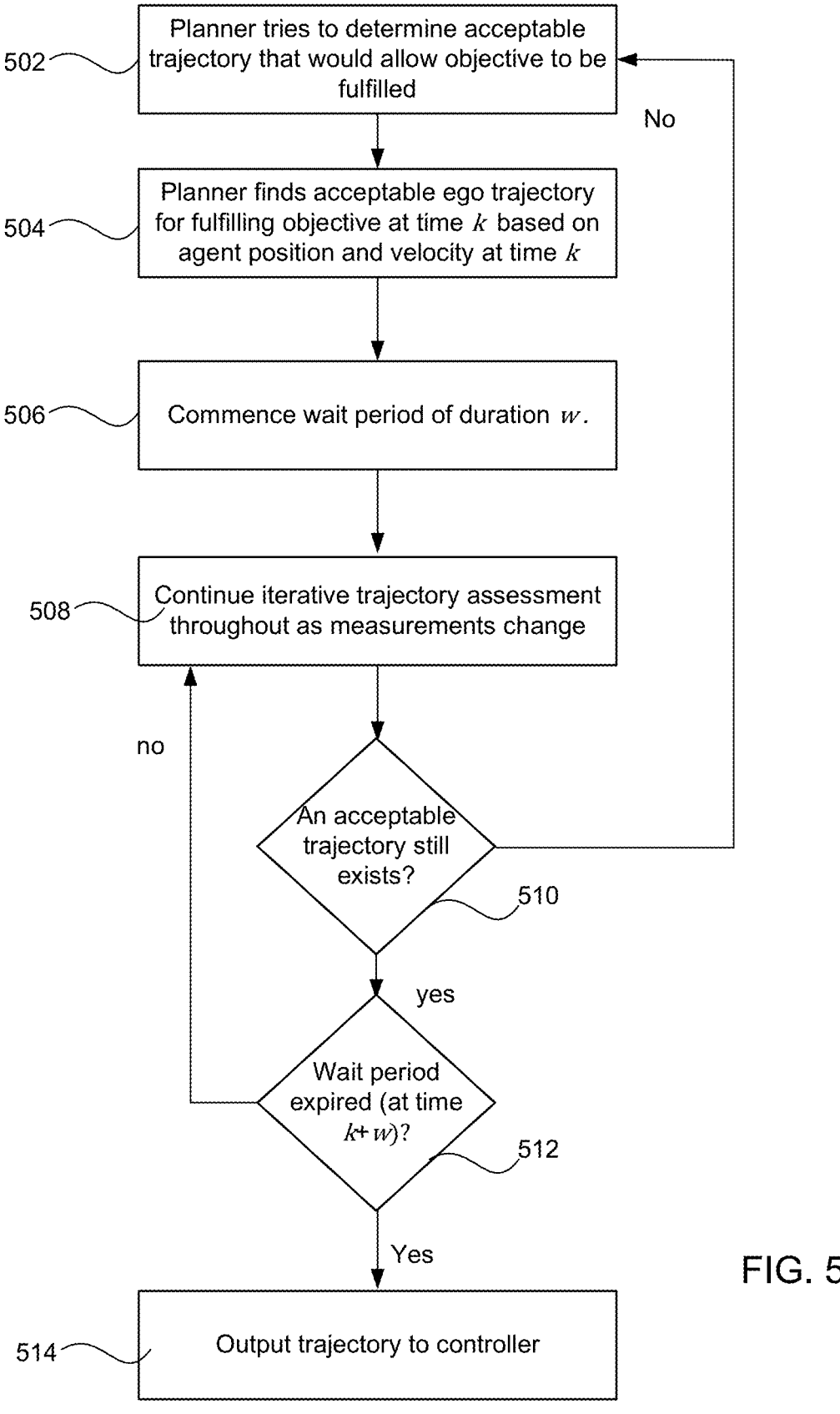
FIG. 5 shows a flowchart for a planning method for planning an ego trajectory.

FIG. 5 shows a high-level flowchart for a trajectory planning process implemented by the planner 106, which includes additional robustness measures.

Throughout step 502, the planner 106 attempts to determine an acceptable trajectory (ego trajectory) that would allow the goal to be fulfilled, leveraging predictions from prediction lite 150 in the manner described above with reference to FIG. 4. The planner 106 will not necessarily be able to determine such a trajectory straight away. For example, in a roundabout context, it could be that, for some period of time, the planner 106 is unable to determine a collision-free trajectory that would allow the EV 300 to enter the roundabout, and EV 300 might therefore remain stationary waiting to enter the roundabout.

It is assumed an acceptable ego trajectory is found some at time k (Step 504), i.e. on the basis of the state of the agent 220 at time k. Step 504 represents the first point in time at which the planner 106 determines the existence of an acceptable trajectory that would allow the goal to be fulfilled (e.g. this could be the first point at which the planner 106 determines that there is a safe way to enter the roundabout). This could be a substantially optimal trajectory (e.g. comfort-optimized) determined by assessing multiple possible ego trajectories that are all collision free. In other words, step 504 is the first point in time at which the planner 106 has determined that it would be possible to attempt to fulfil the goal based on the predictions from prediction lite 105.

Steps 502 and 504 are part of the same ongoing, iterative process, where the planner 106 repeatedly checks that an acceptable trajectory still exists (here, a first check is at time k, then another at time k+dt, then k+2*dt and so on, where dt is e.g. in the order of hundredths of a second). Each iteration involves applying prediction lite 105 and assessing the collision risk of at least one possible ego trajectory. In general, it is expected that the optimal trajectory may change from step to step as the scenario progresses.

An acceptable trajectory in this context means one which would fulfil the goal, is predicted to be collision free, and which may also be required to satisfy other constraints, such as absolute limits on jerk (a form of comfort constraint). An optimal trajectory means one that is optimized with respect to applicable constraints, such as comfort. As will be appreciated, there are various known trajectory planning methods which leverage predicted motion, and the present disclosure is not limited to any particular form of trajectory planning. For that reason, the focus of the following description is on the interaction between Prediction Lite 105 and the trajectory planning, for the purpose of assessing the acceptability of potential ego trajectories.

In this example, when an acceptable ego trajectory that would fulfil the objective is found, the planner 106 does not attempt to fulfil the goal (e.g. enter the roundabout) straight away. To provide additional robustness, the planner 106 waits until at least time k+w where w corresponds to a predetermined "wait time". A suitable wait time can be determined through routine experimentation, e.g. for a given roundabout or city, and is typically expected to be of the order of seconds or hundredths of a second.

As shown in Step 506, throughout the wait interval w, the iterative process continues, with the planner 106 repeatedly checking that an acceptable trajectory still exists (510). If, at any iteration during the wait interval, the planner 106 determines that no acceptable trajectory exists (in particular, if no collision free trajectory exists), the wait period is reset and the method reverts to step 502. The (full) wait interval would then commence again only when an acceptable trajectory is once again found to exist.

If, however, an acceptable trajectory is found to exist at every iteration up to the expiry of the wait interval then, upon expiry of the wait interval, the planner 106 will instigate (514) fulfilment of the goal, for example by outputting the current optimal trajectory (e.g. from the end of the wait period) to the controller 108. As noted, the optical trajectory can change from step-to-step; the requirement is that just a collision-free trajectory (that also meets any other requirements) is determined to exist throughout the wait interval, but it does not have to be the same from iteration to iteration. For example, the optimal trajectory may change as the agent's pose/velocity vary and/or is/are re-estimated by the perception system.

The planned trajectory at the end of the wait period will be the basis on which the EV 300 first attempts to fulfil the goal (e.g. starts to enter the roundabout), but as in the wait interval, the iterative prediction and planning processes continue, in order to dynamically update the optimal trajectory as the scenario continues to develop. Initial control signal(s) from the controller 108 may closely reflect the optimal trajectory planned at the end of the wait period, but later control signals may not do so to the same extent (or even at all) as the planner 106 adapts dynamically to changing circumstances.

Figure 6:
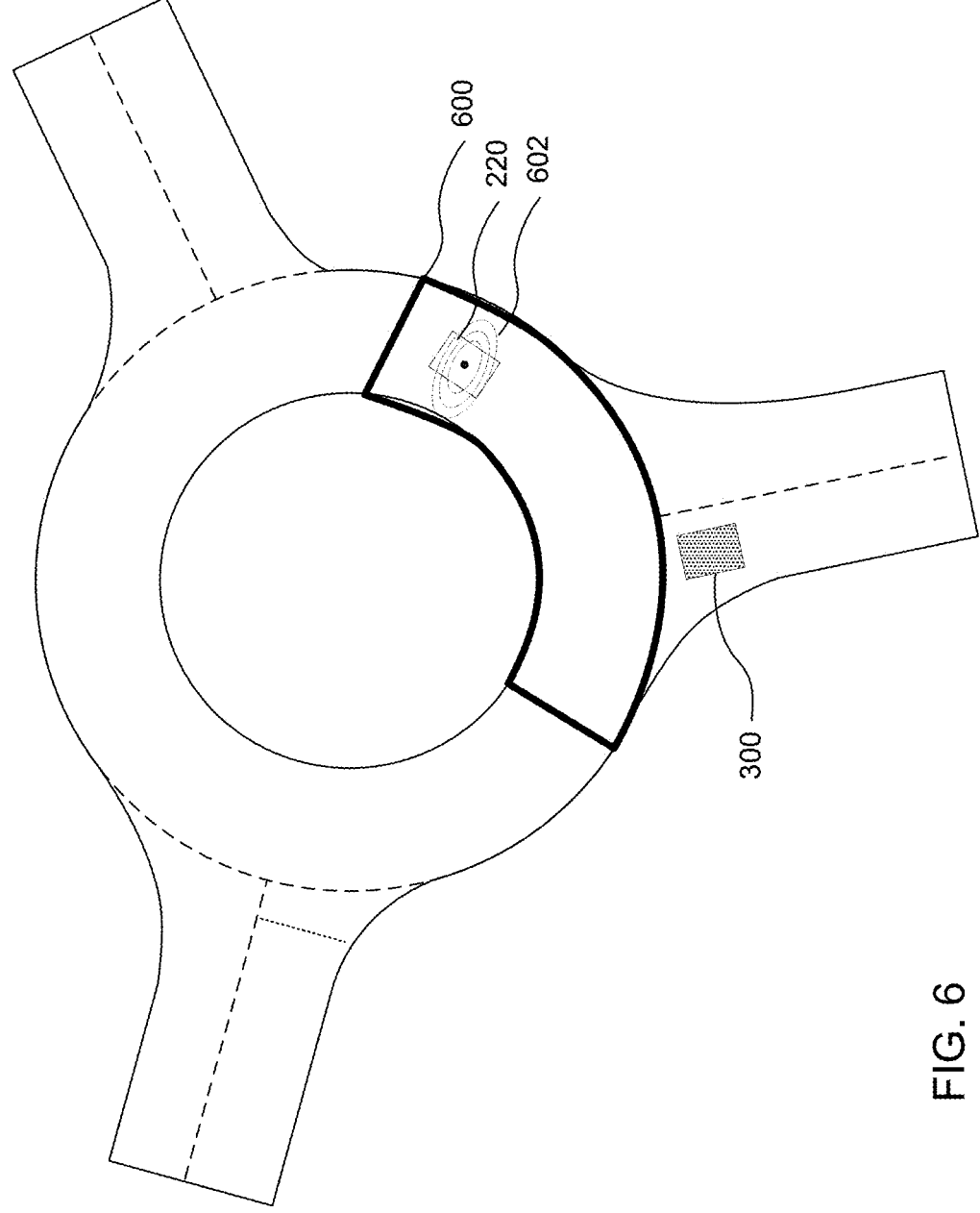
FIG. 6 schematically depicts a "region of interest" used to provide additional robustness to measurement uncertainty.

An additional robustness measure, which is not shown in FIG. 5, is a "region of interest check", the principles of which are illustrated in FIG. 6.

FIG. 6 shows the above roundabout with a region of interest (ROI) 600 defined in relation to Entrance 2. This is a predetermined region associated with Entrance 2 that is deemed to be the greatest risk to a vehicle entering the roundabout at Entrance 2. It is shown in include an area extending to the right of Entrance 2, as well as a smaller area to the left.

This check uses at least one error measure provided by the perception module 102 pertaining to the measured state of the agent 220. For example, this could be one or both of an estimated covariance (or other error measure) on the position of the agent $R_k$ and an estimated covariance (or other error measure) on the velocity of the agent $V_k$. By way of example, FIG. 6 schematically depicts a probability distribution 602 over the agent's position, which would be defined by the position covariance. Other measurement errors such as the error on acceleration, jerk etc. may also be considered.

The planner 106 will not cause the ego vehicle 300 to enter the roundabout at any time at which there is at least one agent in the ROI 600, for which the error measure is unacceptable high (above an error threshold). This is one example of a measurement certainty condition which must be satisfied before the planner 106 will proceed. For example, the ego vehicle 300 may be prevented from entering the roundabout if one or both of the velocity and position covariance exceeds a threshold. This provides a simple but effective mechanism for safe planning under uncertainty, which is complementary to the deterministic implementation of Prediction Lite 105 described above. This covariance check can be implemented in multiple ways. The most conservative approach is to reset the planner wait period (w), however alternative approaches are viable.

The above examples consider a roundabout in a right-hand drive country. For a left-hand drive country (vehicles drive on the right), traffic would flow anti-clockwise, each entrance would be located to the right of the adjacent exit, and traffic to the left of the ego vehicle 300 would have priority, and the above description applies equally with those directions reversed.

Whilst the above considered roundabouts, Prediction Lite 105 is not limited in its application to roundabouts. Other examples of scenarios where it can be usefully deployed include the following:

a scenario in which the ego vehicle seeks to join a major road from a minor road, and a hindering vehicle has the option of staying on the major road to move past the ego vehicle, or leaving the major road before that point in a way that might give the ego vehicle an opportunity to pull out;

a similar scenario where the ego vehicle seeks to join the nearest lane of a multi-lane major road, and a hindering vehicle in the nearest lane has the option of staying in the nearest lane (hindering the ego vehicle) or moving into a different lane (which might give the ego vehicle an opportunity to pull out);

overtaking or chicanes where prediction-lite 105 is used to predict oncoming traffic.

The runtime stack 100 of FIG. 1 is implemented by an on-board computer system of the AV (not shown). The on-board computer system comprises execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The runtime stack 100 can also be implemented in an off-board computer system. For example, it may be applied to simulated inputs generated in a simulator for the purpose of safety and other performance testing. With prediction lite 105, this would apply the prediction method based on simulated perception inputs pertaining to one or more simulated agents in a simulated scenario, in order to simulate the behaviour of the mobile robot in that scenario. The simulated mobile robot behaviour can be analysed for the purpose of safety/performance testing etc. Simulation-based testing is an increasingly vital tool in the safety-critical context of autonomous vehicles. Simulation could be performed for the purpose of testing the stack 100, prior to its deployment in the real word, or the stack 100 could be used as a reference/benchmark against which the performance of another stack is tested before deployment in the real world. In simulation, control signals generated by the controller 108 may be inputted to a vehicle or robot dynamics model in order to compute a realistic ego agent response, akin to that of a physical robot.

The prediction-lite techniques taught herein can be applied at any level of autonomy. The described examples consider an implementation within a sophisticated runtime stack of the kind envisaged to support level 4 or level 5 driving autonomy. However, it will be appreciated that prediction-lite 105 can also be implemented in a semi-autonomous vehicle in the context of driver-assistance technology.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of predicting behaviour of an agent for executing an objective of a mobile robot in a vicinity of the agent, in dependence on the predicted behaviour, the method comprising:
   determining a reference path, wherein multiple actions are available to the agent, and the reference path relates to one of those actions;

projecting a measured velocity vector of the agent onto the reference path, thereby determining a projected speed value for the agent along the reference path;
   computing predicted agent motion data for the agent along the reference path based on the projected speed value;
   assessing, by a planner, a plurality of possible ego trajectories for the mobile robot for fulfilling the objective of the mobile robot, using ego motion data of each possible ego trajectory and the predicted agent motion data along the reference path;
   generating a series of control signals for controlling a mobile robot to fulfil the objective in dependence on the predicted agent motion data; and
   controlling motion of the mobile robot in response to the series of control signals,
   wherein a wait period commences upon the planner first determining that there exists an acceptable trajectory for fulfilling the objective, based on the predicted agent motion, but the planner does not attempt to fulfil the objective until the wait period has expired, with at least one further iteration of the projecting and the computing being performed using an updated measured velocity of the agent for determining whether an acceptable trajectory for fulfilling the objective still exists upon expiry of the wait period, the control signals for fulfilling the objective only being generated once the wait period has expired and only if an acceptable trajectory still exists,
   wherein a controller generates at least an initial control signal of the series of control signals in response to the planner outputting, to the controller, the acceptable trajectory at an end of the wait period, but the planner continues to assess possible ego trajectories and subsequent control signal(s) of the series of control signals are generated in dependence on that continued assessment,
   wherein the wait period only commences if it is determined that the agent satisfies at least one measurement certainty condition, and
   wherein if the at least one measurement certainty condition is satisfied at the commencement of the wait period, but stops being satisfied during the wait period, the wait period resets and does not commence again until the measurement certainty condition is once again satisfied.

2. The method of claim 1, wherein the reference path is determined based on the objective of the mobile robot.

3. The method of claim 1, wherein the agent is assumed to be taking said action to which the reference path relates.

4. The method of claim 3, wherein the agent is assumed to be taking said action without projecting the measured velocity vector onto any other path to which any other action of the multiple actions relates.

5. The method of claim 4, wherein the agent is assumed to be taking said action without any additional step of verifying which of the multiple actions the agent is actually taking.

6. The method of claim 3, wherein the reference path is determined based on the objective of the mobile robot, wherein the assumed action is a worst-case action given the objective of the mobile robot.

7. The method of claim 6, wherein the objective is for the mobile robot to join a target traffic flow, wherein the agent belongs to the target traffic flow or another hindering traffic flow, wherein the assumed worst-case action is the agent remaining in the traffic flow to which it belongs past a location of the mobile robot, and wherein another of the available actions is the agent leaving that traffic flow ahead of the location of the mobile robot.

8. The method of claim 1, wherein each possible ego trajectory is assessed in relation to at least collision risk and comfort.

9. The method of claim 1, wherein multiple iterations of the projecting and the computing are performed throughout the wait period, and the control signals for fulfilling the objective are only generated upon expiry of the wait period if an acceptable trajectory for fulfilling the objective is determined to exist at every iteration throughout the wait period.

10. The method of claim 1, wherein the at least one measurement certainty condition requires at least one measurement error associated with the agent to not exceed an error threshold, if the agent is within a region of interest associated with a current location of the mobile robot.

11. The method of claim 10, wherein the agent is a vehicle on a roundabout, the objective is for the mobile robot to join the roundabout at an entrance of the roundabout, a worst-case action is the agent remaining on the roundabout past said entrance, and another of the available actions is the agent exiting the roundabout ahead of said entrance, wherein the region of interest is a predetermined region associated with said entrance of the roundabout.

12. The method of claim 1, wherein the predicted agent motion data is computed based on the projected speed value and a curvature of the reference path.

13. The method of claim 1, wherein the predicted agent motion comprises multiple predicted locations on the reference path for the agent at multiple future time instants, wherein a configuration of the mobile robot at each of those multiple future time instants is determined based on a possible trajectory for the mobile robot, in order to determine whether or not a predicted collision occurs at each of those multiple timesteps.

14. A computer system comprising:
at least one memory embodying executable instructions;
at least one hardware processor coupled to the at least one memory and configured to predict behaviour of an agent for executing an objective of a mobile robot in a vicinity of the agent in dependence on the predicted behaviour, by:
determining a reference path, wherein multiple actions are available to the agent, and the reference path relates to one of those actions;
projecting a measured velocity vector of the agent onto the reference path, thereby determining a projected speed value for the agent along the reference path;
computing predicted agent motion data for the agent along the reference path based on the projected speed value;
assessing, by a planner, a plurality of possible ego trajectories for the mobile robot for fulfilling the objective of the mobile robot, using ego motion data of each possible ego trajectory and the predicted agent motion data along the reference path;
generating a series of control signals for controlling a mobile robot to fulfil the objective in dependence on the predicted agent motion data; and
controlling motion of the mobile robot in response to the series of control signals,
wherein a wait period commences upon the planner first determining that there exists an acceptable trajectory for fulfilling the objective, based on the predicted agent motion, but the planner does not attempt to fulfil the objective until the wait period has expired, with at least one further iteration of the projecting and the computing being performed using an updated measured velocity of the agent for determining whether an acceptable trajectory for fulfilling the objective still exists upon expiry of the wait period, the control signals for fulfilling the objective only being generated once the wait period has expired and only if an acceptable trajectory still exists,
wherein a controller generates at least an initial control signal of the series of control signals in response to the planner outputting, to the controller, the acceptable trajectory at an end of the wait period, but the planner continues to assess possible ego trajectories and subsequent control signal(s) of the series of control signals are generated in dependence on that continued assessment;
wherein the wait period only commences if it is determined that the agent satisfies at least one measurement certainty condition, and
wherein if the at least one measurement certainty condition is satisfied at the commencement of the wait period, but stops being satisfied during the wait period, the wait period resets and does not commence again until the measurement certainty condition is once again satisfied.

15. The computer system of claim 14, embodied in a mobile robot for controlling motion of the mobile robot, or in a simulator for simulating mobile robot motion in response to predicted agent motion data for one or more simulated agents.

16. Non-transitory media embodying executable instructions configured, upon execution by at least one hardware processor, to perform a method for predicting behaviour of an agent for executing an objective of a mobile robot in a vicinity of the agent in dependence on the predicted behaviour, the method comprising:
determining a reference path, wherein multiple actions are available to the agent, and the reference path relates to one of those actions;
projecting a measured velocity vector of the agent onto the reference path, thereby determining a projected speed value for the agent along the reference path;
computing predicted agent motion data for the agent along the reference path based on the projected speed value;
assessing, by a planner, a plurality of possible ego trajectories for the mobile robot for fulfilling the objective of the mobile robot, using ego motion data of each possible ego trajectory and the predicted agent motion data along the reference path;
generating a series of control signals for controlling a mobile robot to fulfil the objective in dependence on the predicted agent motion data; and
controlling motion of the mobile robot in response to the series of control signals,
wherein a wait period commences upon the planner first determining that there exists an acceptable trajectory for fulfilling the objective, based on the predicted agent motion, but the planner does not attempt to fulfil the objective until the wait period has expired, with at least one further iteration of the projecting and the computing being performed using an updated measured velocity of the agent for determining whether an acceptable trajectory for fulfilling the objective still exists upon expiry of the wait period, the control signals for fulfilling the objective only being generated once the wait period has expired and only if an acceptable trajectory still exists, wherein a controller generates at least an initial control signal of the series of control signals in response to the planner outputting, to the controller, the acceptable trajectory at an end of the wait period, but the planner continues to assess possible ego trajectories and subsequent control signal(s) of the series of control signals are generated in dependence on that continued assessment, wherein the wait period only commences if it is determined that the agent satisfies at least one measurement certainty condition, and wherein if the at least one measurement certainty condition is satisfied at the commencement of the wait period, but stops being satisfied during the wait period, the wait period resets and does not commence again until the measurement certainty condition is once again satisfied.

* * * * *